H. SIEGWART.
MACHINE FOR MAKING REINFORCED TUBULAR BODIES FROM CONCRETE.
APPLICATION FILED NOV. 28, 1914.

1,263,613.

Patented Apr. 23, 1918.
7 SHEETS—SHEET 1.

Witnesses:
B. Dommers
E. Leckert

Inventor:
Hans Siegwart,
By [signature]
Atty.

H. SIEGWART.
MACHINE FOR MAKING REINFORCED TUBULAR BODIES FROM CONCRETE.
APPLICATION FILED NOV. 28, 1914.

1,263,613.

Patented Apr. 23, 1918.
7 SHEETS—SHEET 2.

Witnesses:
B. Dommers
E. Leckert

Inventor:
Hans Siegwart
By Henry J. Ely Jr.
Atty.

H. SIEGWART.
MACHINE FOR MAKING REINFORCED TUBULAR BODIES FROM CONCRETE.
APPLICATION FILED NOV. 28, 1914.

1,263,613.

Patented Apr. 23, 1918.

Witnesses:
B. Dommers
E. Leckert

Inventor:
Hans Siegwart
By [signature]
Atty.

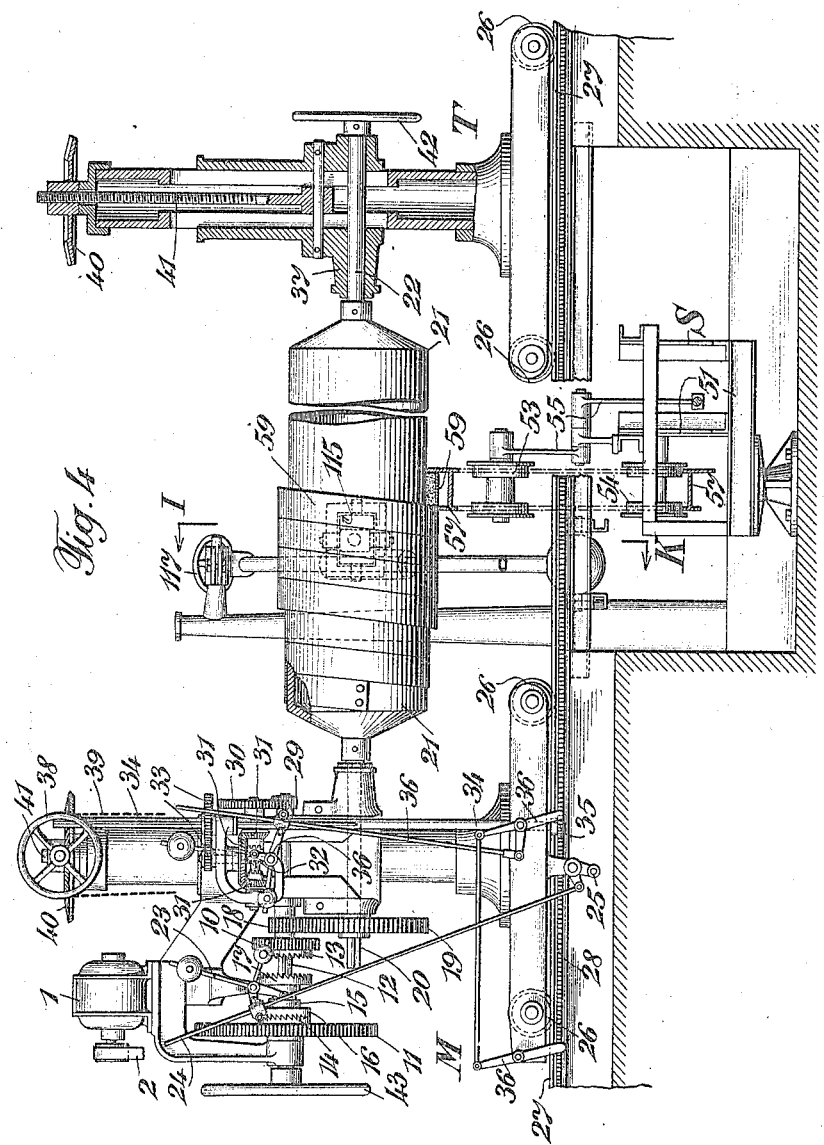

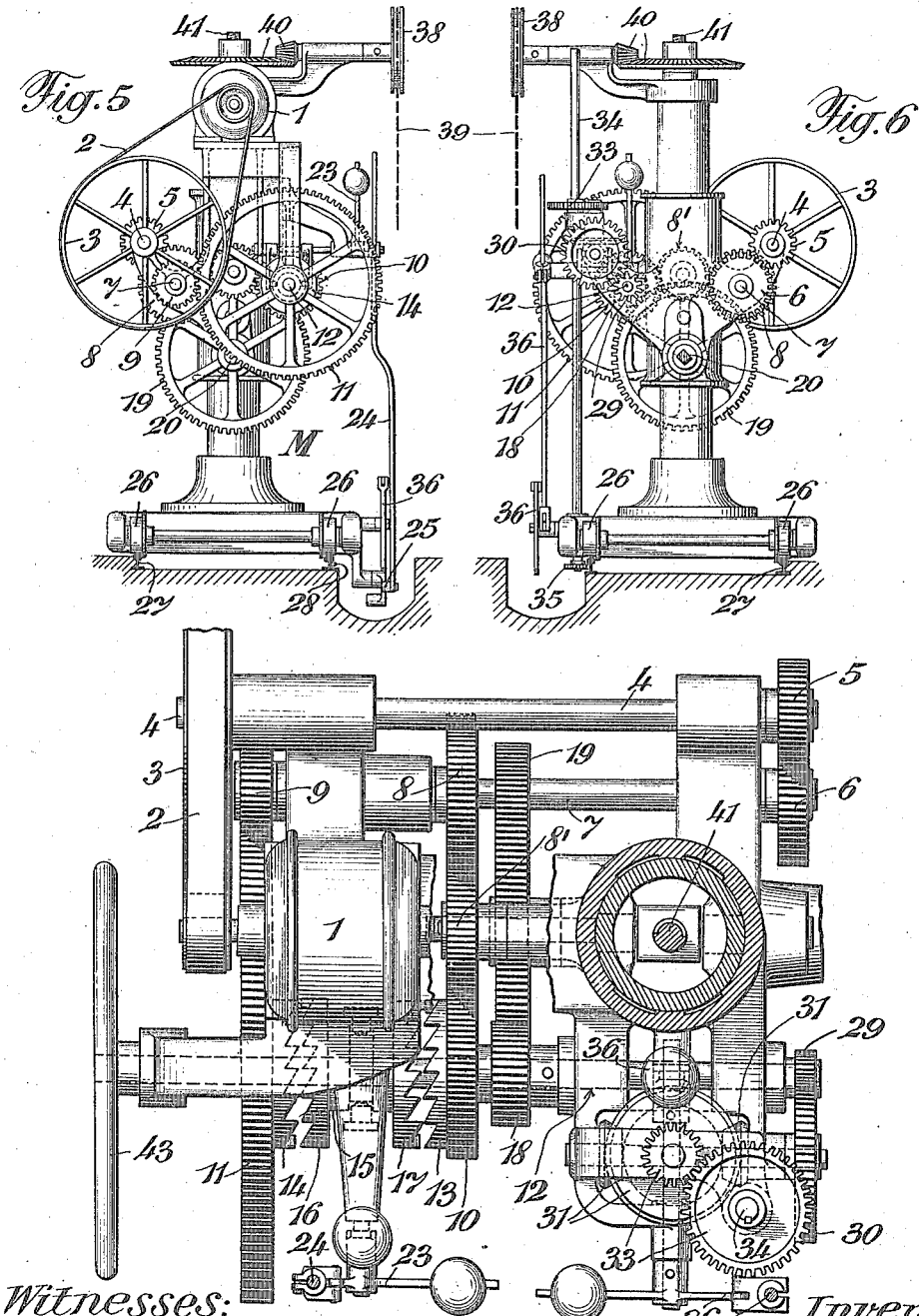

H. SIEGWART.
MACHINE FOR MAKING REINFORCED TUBULAR BODIES FROM CONCRETE.
APPLICATION FILED NOV. 28, 1914.
1,263,613.
Patented Apr. 23, 1918.
7 SHEETS—SHEET 6.
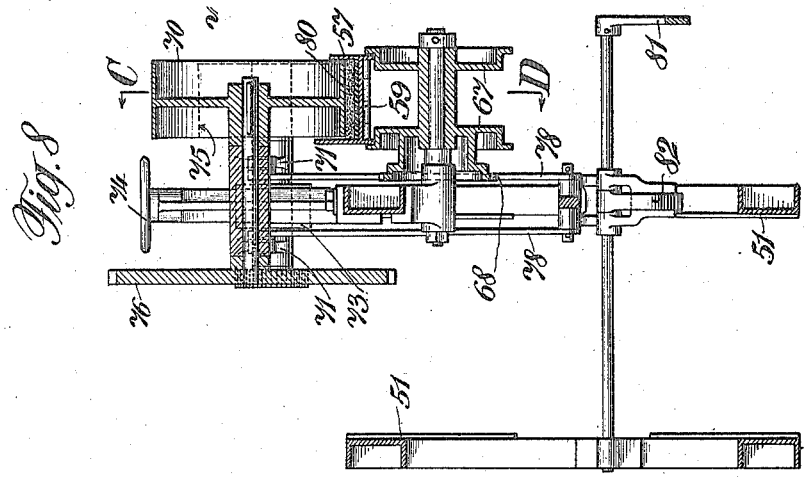
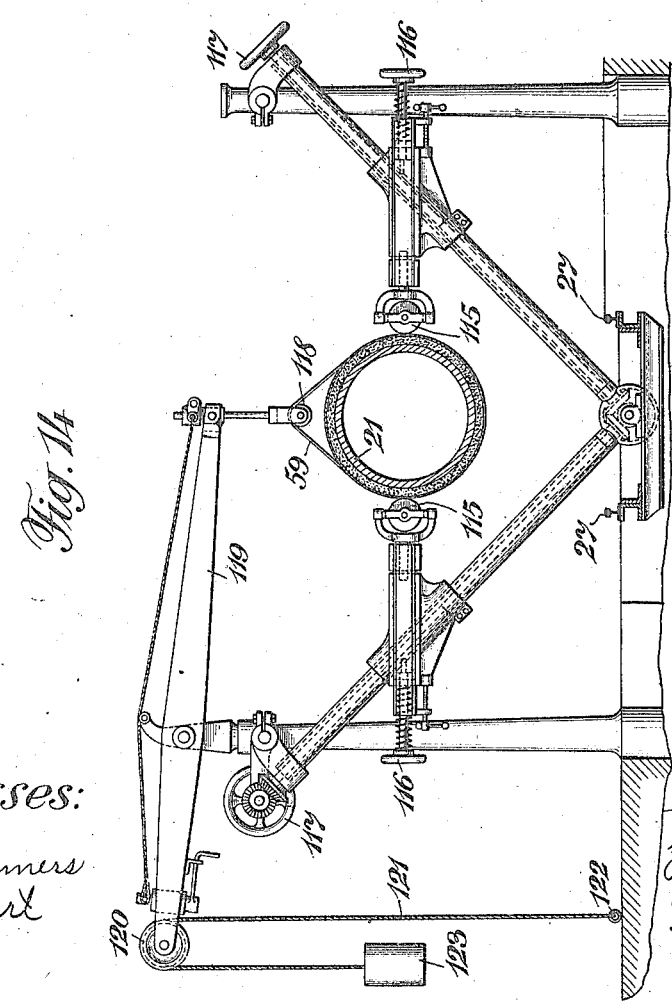
Witnesses:
B. Dommers
E. Leckert
Inventor:
Hans Siegwart
By
atty

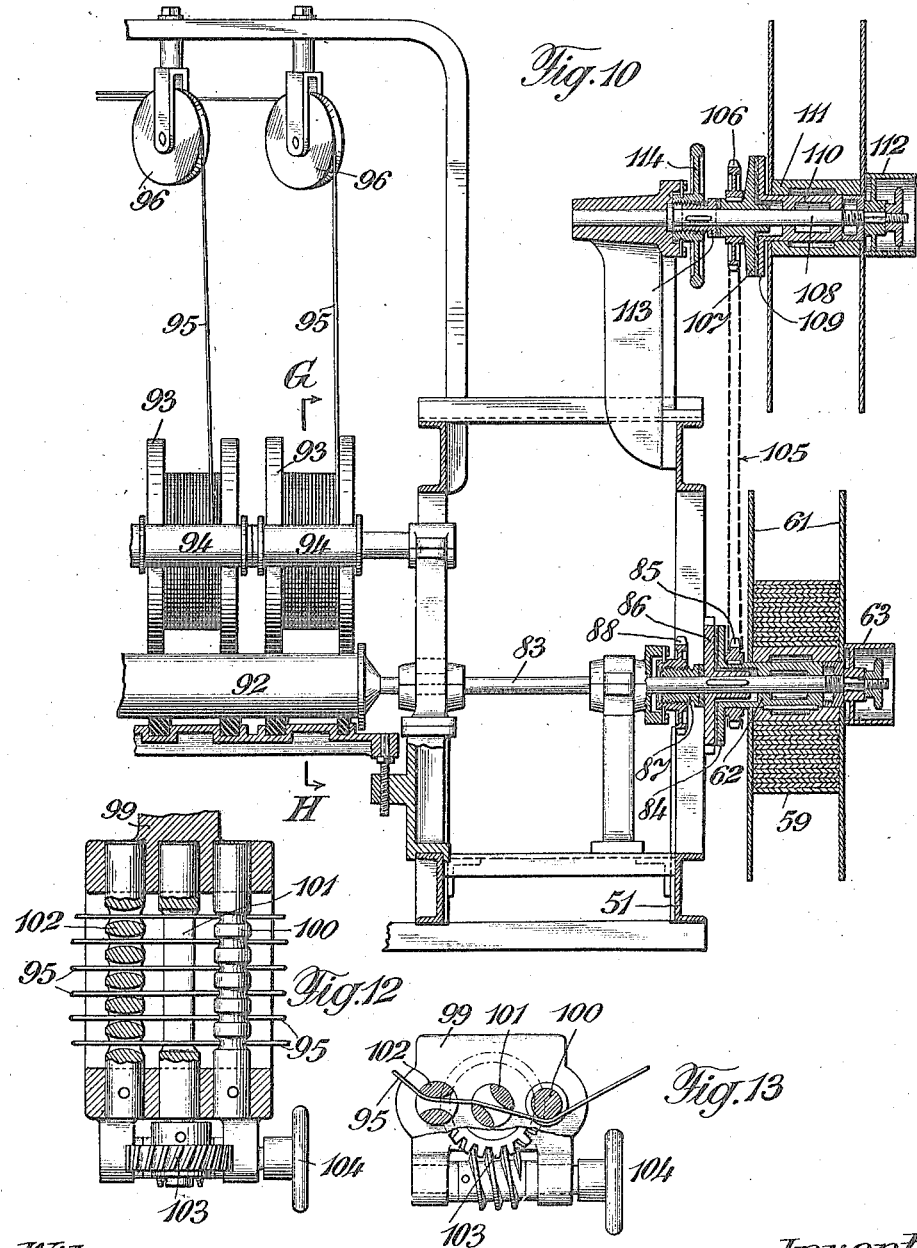

UNITED STATES PATENT OFFICE.

HANS SIEGWART, OF LUCERNE, SWITZERLAND.

MACHINE FOR MAKING REINFORCED TUBULAR BODIES FROM CONCRETE.

1,263,613.                 Specification of Letters Patent.      Patented Apr. 23, 1918.

Application filed November 28, 1914.   Serial No. 874,562.

*To all whom it may concern:*

Be it known that I, HANS SIEGWART, a citizen of the Republic of Switzerland, residing at Lucerne, Switzerland, have invented new and useful Improvements in Machines for Making Reinforced Tubular Bodies from Concrete; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

This invention relates to improvements in the manufacture of reinforced, hollow bodies, for example hollow piles, conduits, pipes, poles, hollow masts and the like from a plastic mass.

The characteristic feature in known similar manufacture is that by beton mass and the stiffening parts are helically wound under strong pressure in strips around a core intended to form the hollow space. Contrary to this known manufacture, according to the present invention, the strip of mass is pre-pressed before it is wound on the core and is held under pressure by a pressing band until the core is completely wrapped. Thereupon reinforcing wires are wound on the pipe of concrete after the pressing band is wound off. After the pipe has been reinforced by rods, a further layer of the mass is wound around the core.

As the strip of mass is pressed before its winding, and as the strip of the mass is held under pressure by the pressing band until the core is completely wrapped, contrary to the known method, the resulting advantage is that the strip becomes so hard that the reinforcing wires will no longer cut into the strip.

Furthermore the pre-pressing has the advantage that a second strip can be pressed upon the strip of the mass already pressed. Also the holding of the strip of the mass under pressure enables a further treatment of this intermediate product to be begun at once.

In the machine the core is turned by means of a driving mechanism mounted on one of its supporting carriages and the already pressed strip of the mass is pressed onto the core by a pressing band fixed to one of its ends, at the same time being able to move other parts of the machine for example distributer means for pre-pressing and conveyer-trough.

The accompanying drawings illustrate by way of example a machine for carrying out the process according to this invention.

Fig. 4 shows a front view of the whole machine, parts thereof in section, the core being shortened.

Figs. 5 and 6 show to and fro moving parts of the machine in side elevations.

Fig. 7 shows a plan view of Fig. 5, some parts on larger scale being omitted.

Fig. 8 shows a section at A—B of Fig. 2.

Fig. 10 shows a section at E—F of Fig. 2 on a larger scale,

Fig. 11 shows a section at G—H of Fig. 10,

Fig. 12 is an enlarged sectional view of the means for stretching wires,

Fig. 13 shows the same detail in side elevation,

Fig. 14 shows a section at I—K of Fig. 4.

Figure 1:
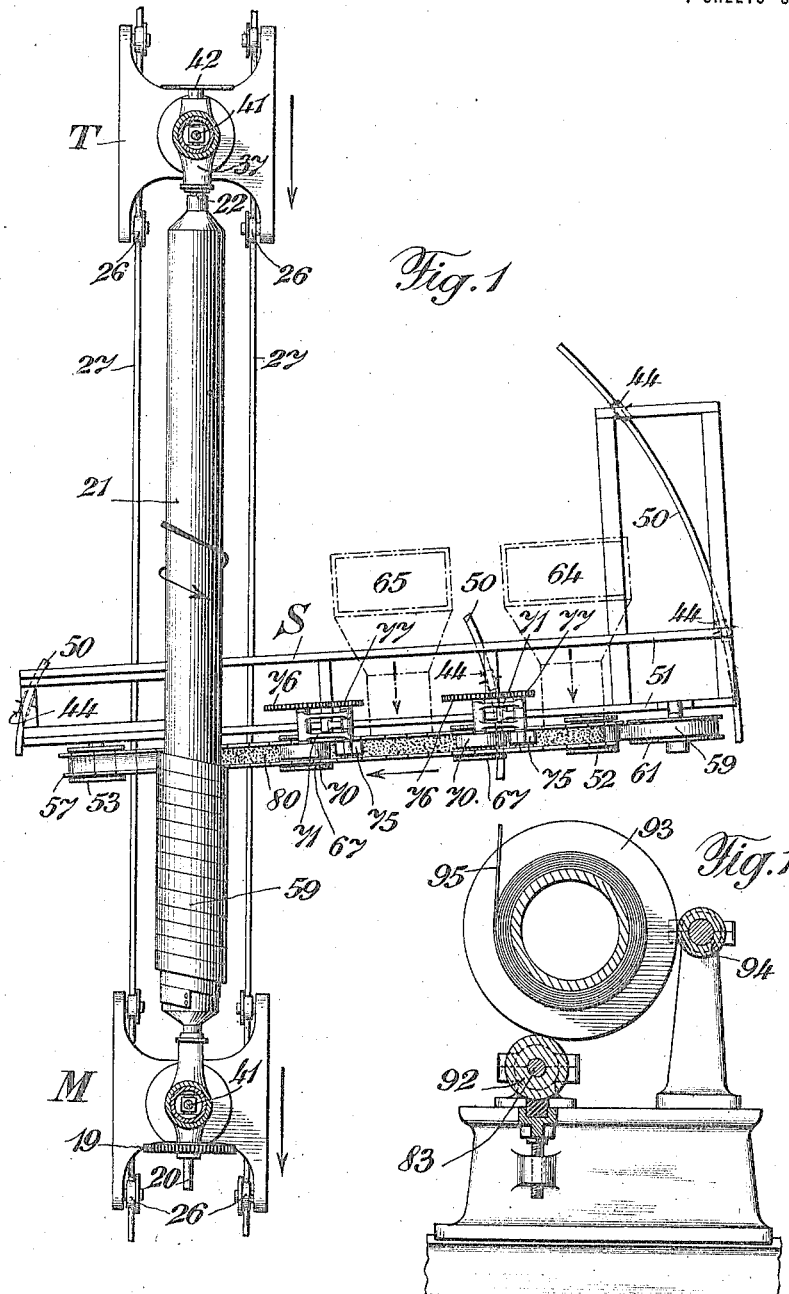
Figure 1 shows a general view of the machine from above, some parts being omitted.

The machine has a stationary part S and two carriages T and M which can be rolled to and fro in a direction diagonal to the stationary part of the machine S as shown in Fig. 1. A driving motor 1 is mounted on the carriage M (Figs. 4, 5 and 7) said motor propelling a pulley 3 by means of a belt 2 (Figs. 5 and 7). On the shaft 4 of this pulley 3 a toothed wheel 5 is fixed, engaging with a toothed wheel 6. The shaft 7 of the toothed wheel 6 carries two different sized toothed wheels 8 and 9, toothed wheel 9 being in engagement with the toothed wheel 11 and toothed wheel 8 being in engagement with an idle wheel 8' engaging with toothed wheel 10. The toothed wheels 10 and 11 are loosely mounted on a shaft 12 and each of them carries the half of a clutch coupling 13 14 respectively. A coupling box 15 is slidably mounted on the shaft 12 between the two halves 13 and 14 of the clutch couplings and carries the other corresponding halves 16 and 17 of said clutch couplings. The coupling box 15 rotates the shaft 12 in one direction, when the coupling members 14, 16 are engaged, and in the opposite direction if the coupling members 13, 17 are engaged. A toothed wheel 18 is also fixed to the shaft 12 engaging with a toothed wheel 19 fixed to a shaft 20 (Fig. 4) carrying a core 21, its other end being rotatably mounted by means of a journal 22 within the carriage T. Thus the motor 1 is rotating the core 21 in the one or the other direction according to the position of the coupling box 15. The box 15 is reversed by a system of rods 23, 24, 25 (Fig. 4), being thrown over, if it strikes with its lower part against stationary stops. The carriages M and T rest with wheels 26 on rails 27. On the outside of one rail 27 is fixed a rack 28. Furthermore a toothed wheel 29 is fixed to the shaft 12 engaging a toothed wheel 30 the shaft of which carries a right angle bevel gear system 31, a coupling box 32 being also mounted between said system. From the bevel gear system 31 a shaft 34 is brought into rotation by means of toothed wheels 33 in the one or the other direction according to the position of the coupling box 32. The lower end of the shaft 34 carries a toothed wheel 35 being in engagement with the rack 28. According to the position of the coupling box 32 the carriage M and also the carriage T will thus be slowly moved in the one or in the other direction. The moving of the coupling box 32 is effected by a system of rods 36 being also thrown over if it strikes against stationary stops fixed to the ends of the rails 27. The whole building up of the carriage M with motor 1 and also the bearing 37 of the journal 22 can be moved up and down. By turning chain wheels 38 by means of hand chains 39 a bevel gear 40 at each of the two carriages M and T is rotatable, one of the bevel gear wheels of the gear serving at the same time as a nut for each spindle 41 (Fig. 4). The parts movable in vertical direction on the carriages M and T are connected to the spindles 41. Handwheels 42 and 43 serve to adjust the core 21 by hand.

Figure 2:
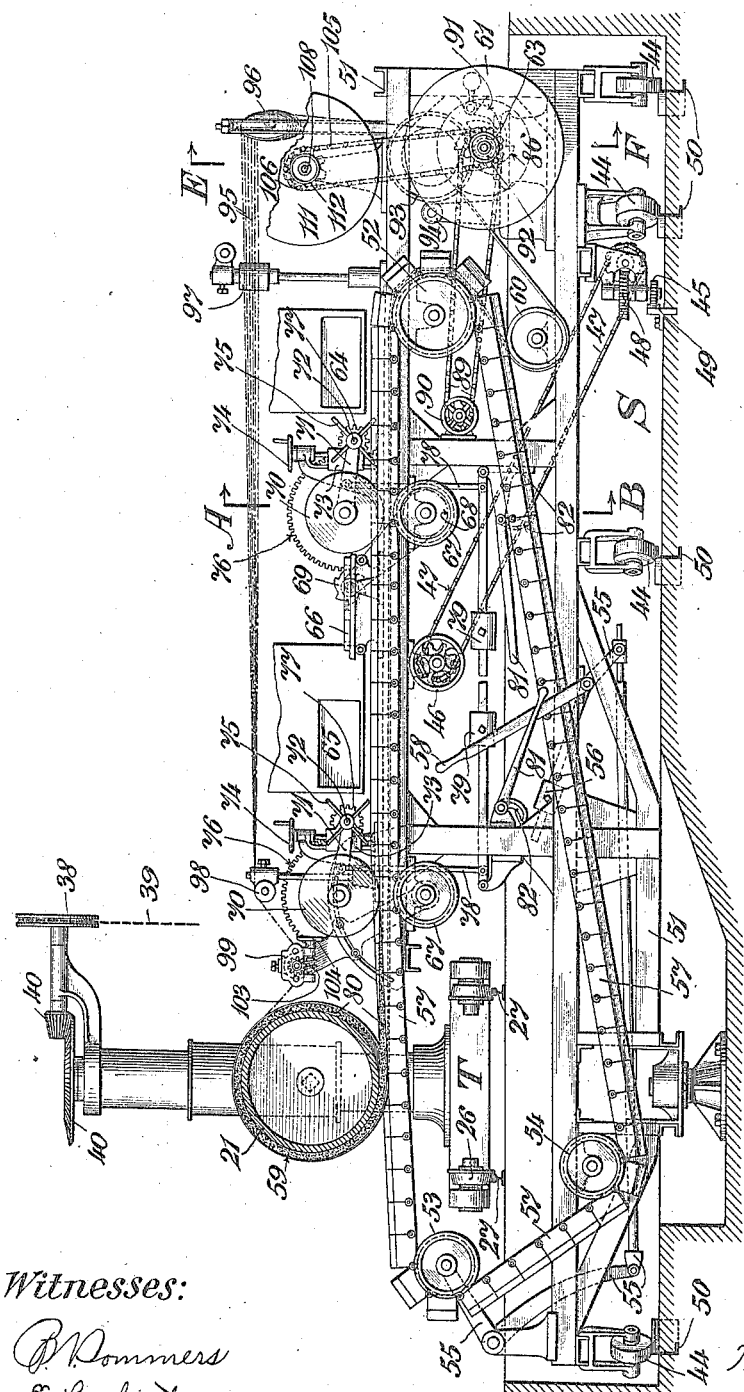
Fig. 2 shows a side elevation of the stationary part of the machine.
Figures 3, 9:
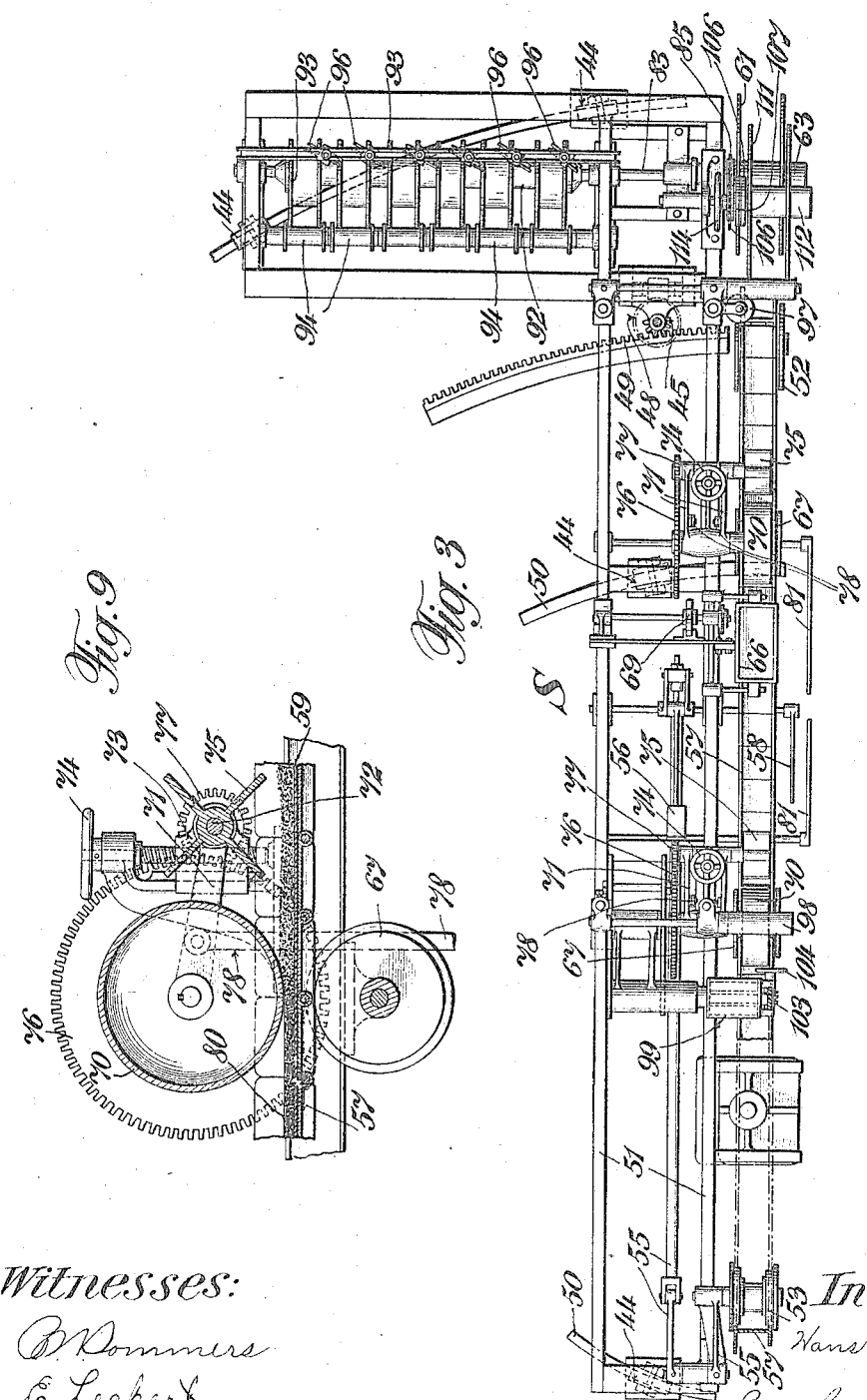
Fig. 3 shows a plan view of Fig. 2.
Fig. 9 shows a section at C—D of Fig. 6.

The part S of the machine is stationary between the two carriages M and T as seen from Figs. 1 and 4. The part S is stationary during working, but rests on wheels 44 to enable its adjusting. A toothed wheel 45 (Fig. 2), at the part S of the machine engages with a circular rack 49 (Fig. 3) and is rotatable by means of a handwheel 46, through a chain 47 and a worm-gear 48. The wheels 44 rest on circular rails 50 coaxial to the circular rack 49. By turning the handwheel 46 the angle between the part S of the machine and the core 21 may be varied and adjusted. Fixed bearings for guide-rollers 52 and 54 are provided in the frame 51 of the machine (Fig. 2); another roller 53 is rotatably mounted on lever 55. The lever 55 is influenced by a weight 56 provided with a releasing lever 58 (Fig. 2).

A chain 57 of known construction forming a groove passes over the rollers 52, 53, 54. By the weight 56 the upper part of the groove-chain 57 is tightly stretched between the guiding rollers 52 and 53. Within the upper part of the chain-groove or conveyer-trough 57 lies a pressing band 59 (Fig. 8) that may be a belt for example. One end of this pressing band 59 (Figs. 1 and 4) is detachably fixed to one end of the core 21 so that, if the motor runs and the core is turned in the direction of the arrow in Fig. 1 and the carriages M and T are moved in the direction of the arrow in Fig. 1, the pressing band 59 will be drawn and wrapped helically around the core. The pressing band 59 lies with friction on the bottom of the upper part of the groove 57 then passes over a tension roller 60 (Fig. 2) and on a spool 61 (Fig. 10) which is connected to a journal box 62 by a key and also connected to brake pulley 63, being braked in a known manner, in order to press the pressing band 59 firmly to the bottom of the groove 57 thus imparting to the latter a movement, but at the same time also in order to wind the pressing band under a strong pressure upon the core 21. Two feeders 64 and 65 serve for bringing mass for instance beton upon the pressing band. For instance the feeder 64 may deliver pure beton and the feeder 65 may deliver mortar with an addition of waterproof means, for instance emulsion of bitumen, clay or pure asphalt. Each feeder can be provided with shaking means 66, as is shown on the drawing by feeder 65. The shaking means are also driven by the movement of the pressing band 59, as the groove-chain 57 driven by the pressing band 59 grips a guiding roller 67 (Figs. 8 and 9), a chain-wheel 68 being fixed thereto. The latter impels the shaking wheel 69.

On the side of the core 21 in front of each feeder means are provided to equally distribute and to pre-press the mass fallen by heaps out of the feeder. These means are shown in Figs. 2, 3, 8 and 9. A pressing cylinder 70 grips into the groove 57 and usually lies, if no mass is on the pressing band 59, close to the latter. This pressing cylinder 70 is rotatably mounted at the end of a fork-shaped lever 71, mounted loosely and rotatably around a shaft 72 lying in a bearing 73, which is adjustable in a vertical direction by turning of a handwheel 74. On the shaft 72 a distributer 75 with a plurality of distributing wings is rotatably mounted. With the pressing roller 70 a toothed wheel 76 is connected engaging with a toothed wheel 77 (Fig. 9) fixed to the distributer 75. A rod 78 influenced by weight 79 (Fig. 2) is attached to the lever 71, so that the pressing roller 70 is always drawn downward and is turned by its friction against the pressing band or against the layer 80 of mass conveyed by said band, whereby the distributer 75 is turned. The pressing roller 70 can be lifted upward by means of a hand-lever 81 actuating an eccentric cam 82 (Fig. 2), that may lift the lever of the weight 79.

These means for distributing and pre-pressing are not only applied to the feeder 64, but also to the feeder 65.

As forementioned the spool 61 (Fig. 10) is connected to the box 62 by a key. Said box is rotatably mounted on a shaft 83 and has a friction disk 84 and a chain-wheel 85 fixed thereon. On the shaft 83 is keyed a ratchet wheel 86 which serves also as a friction disk and forms a friction coupling with the friction disk 84. Further a box 87 externally screw-threaded is rotatable on the shaft 83. This box 87 lies close to the other side of the ratchet wheel 86 with a lubricator packing between them. A chain-wheel 88 is screwed on the box 87 and can be turned by means of a hand wheel 90 through a chain 89 (Fig. 2). The coupling 84, 86 can thus be thrown in and out by this hand wheel. During the helically winding up of the pressing band 59 onto the core 21 the coupling is thrown out. A pawl 91 hereby engages with the ratchet wheel 86 (Fig. 2) and thus prevents a rotation of the shaft 83 during the unwrapping of the pressing band from the spool 61.

A cylinder 92 is connected to the shaft 83 (Figs. 10 and 11). The rims of the wire spools 93 rest upon the cylinder and against rotatable rollers 94. The wires 95 are guided by guide rollers 96, 97, 98 (Fig. 2) toward a tension-controller, Figs. 12 and 13. This tension controller consists of a casing 99 with three bars therein. The first bar 100 is provided with grooves on the outside, the second one 101 has a slit, the third one 102 has openings. The wires 95 are bent as shown in Fig. 13, by the rods 101 and 102 for engendering tension and friction. The rods 100 and 102 are nonrotatable, but the rod 101 can be adjusted by a hand wheel 104 through the medium of a worm gear 103 for increasing or diminishing the tension.

Over the chain wheel 85 (Fig. 10) passes a chain 105 which is guided over a chain wheel 106. The latter is fixed to a bushing of a friction disk 107 which is loosely, but slidably mounted on a shaft 108. A second friction disk 109 forms together with the friction disk 107 a friction coupling and is fixed to a box 110, being also rotatably, but not slidably mounted on the shaft 108. Journaled on this box 110 is a spool 111, provided with a brake pulley 112. This spool 111 is destined to receive the coating strap, which will be wrapped last of all as a cover or coat around the tubular body provided with a plurality of layers if it is still carried by the core 21, whereupon the core with the tubular body and the wrapping is removed from between the carriages M and T and set aside for drying. Against the bushing of the friction disk 107 lies a box 113 with a lubricator packing between them, a hand wheel 114 being screwed onto said box.

Means for a second pressing are still arranged next to the part S of the machine on the side of the carriage M. These means comprise two cylinders 115 being pressed by hand-wheels 116 against the pressing band helically wrapped around the mass layer (Fig. 14). The height of these cylinders 115 is adjustable by hand wheels 117 for bringing them in a position according to the position of the core 21. As the pressing band 59 will now be somewhat loosened due to said second pressing, it passes over a roller 118, (only shown in Fig. 14) hanging at one arm of a lever 119, the other arm having a roller 120 over which a rope or cable passes one of the ends of the cable carrying a weight 123 the other end of the cable being fixed. The roller 118 can thus yield.

The operation of the machine is as follows:

One end of the pressing band 59 is fixed to the core 21 as has already been stated. Now at first by the feeder 64 for instance pure beton is brought on the pressing band within the groove 57 and is equally distributed by the distributer 75, on the pressing band. By the pressing cylinder 70 under the influence of its weight and the weight 79 the beton is pre-pressed. The pre-pressed layer arriving at the feeder 65 and a second layer of (for instance) mortar with an addition of a waterproof agent is here brought upon the first layer and again equally distributed by the other distributer 75 and pre-pressed by the second pressing cylinder 70. This could also be repeated three, four and more times. Then the pre-pressed layer 80 is firmly wrapped around the core together with the pressing band 59. This motion is derived from the motor 1, said motor moving simultaneously the carriages M and T. During this working the couplings 84, 86 and 107, 109 (Fig. 10) are thrown out, so that only the braked spool 61 will deliver the pressing band, and the wire spools 93 and the spool 111 will stand still. If the carriage T (Fig. 1) has arrived at the part S of the machine, then the core 21 is entirely wrapped, after some time or immediately the carriages M and T and the core will be moved in the opposite direction due to the reversing of the system of rods 24, 25 and 36 (Fig. 4). Before this the coupling 84, 86 (Fig. 10) will be thrown in by hand-wheel 90 and the projecting ends of the reinforcing wires 95 projecting out of the tension controller 99 (Fig. 2) are fixed to the end of the core 21 next to the carriage T. The core 21 now turning in a direction opposite to the direction indicated in Fig. 1 the pressing band 59 will be unwrapped and at the same time the reinforcing wires will be wound under tension onto the pressed conduit. These wires 95 are pulled off from the spools 93, whereby these spools will rotate and hereby impart a rotating movement to the cylinder 92 by friction. Hereby the shaft 83 is turned in an opposite direction and thus also the spool 61, whereby the pressing band is again wound upon this spool. As the layer of the mass has firmly been pressed on the core 21, the reinforcing wires do not cut into the mass, as tests have proved, but are firmly wound up onto the mass. This is an essential advantage, as the helical windings keep their right position and also will be kept tightly stretched during the applying of further layers and longitudinal reinforcements, for then being able to counteract afterward the forming of flaws due to internal pressure within the pipe. Now the longitudinal reinforcement can be applied and tightened in a known manner and then a further layer of mass can be brought up under pressure by the pressing band. The last layer of mass being brought up under pressure, the coupling 84, 86 and also the coupling 107, 109 (Fig. 10) is thrown in. Then one end of the coating strap wound on the spool 111 is fixed to one end of the core 21 in the same way as before the wires have been fixed to the one end of the core 21 and now by simultaneously winding off the pressing band and winding it up onto the spool 61 the strap is wrapped up around the pipe, said strap being wound off the spool 111. All these movements are imparted by the motor on the carriage M and are transmissed through the medium of the pressing band to the mechanical means of the steady part S of the machine. The first layer may also be rolled frequently.

I claim:

1. In a machine for the manufacture of reinforced tubular articles, a core, a pressing band connected to the core, a distributer for supplying a plastic mass onto said band, means operated by the band for pressing said mass before it is wound onto the core, means for simultaneously rotating and longitudinally moving the core to wrap said band together with the mass around the core, means for pressing said band to the mass during its wrapping onto the core, a conveying trough impelled by said pressing band, means for reversing the rotation of the core for unwrapping the pressing band from the core, reinforcing wires adapted to be wrapped around the mass during the reversed motion of the core, a spool for said wires, and means operated by said spool for winding up the pressing band during the unwrapping of the latter from the core.

2. In a machine for the manufacture of reinforced tubular articles, a core, a pressing band connected to the core, a distributer for supplying a plastic mass onto said pressing band, means operated by the latter for pressing said mass before it is wound onto the core, means for simultaneously rotating and longitudinally moving the core to wrap said band together with the mass around the core, means for pressing said pressing band to the mass during its wrapping, means for reversing the rotation of the core for unwrapping the band from the core, reinforcing wires for connection to the core and adapted to be wrapped around the mass during the reversed motion of the core simultaneously with the unwrapping of the pressing band from the core, spools for the wires, a spool for said pressing band, and driving means operated by the movement of the spools for the wires for driving the pressing band spool during the unwrapping of said pressing band from the core.

3. In a machine for the manufacture of reinforced tubular articles, a core, a pressing band, mechanism for supplying a plastic mass to the band, means for distributing the plastic mass onto said pressing band, means for pressing said mass onto the latter, means for simultaneously rotating and longitudinally moving the core to wrap said band together with the mass around the core, means for pressing said band to the mass during its wrapping, a conveying trough impelled by the band and operating the supply mechanism, means for reversing the motion of the core for unwrapping the pressing band from the core, reinforcing wires for connection to the core, means including the core whereby said wires are wrapped around the mass during the reversed motion of the core simultaneously with the unwrapping of the pressing band from the core, spools for the wires, a spool for said pressing band, and means operated by the rotation of the spools for the wire for winding up the pressing band on its spool during the unwrapping of said band from the core.

4. In a machine for the manufacture of reinforced hollow articles, a core, an endless trough, means for supplying a plastic mass thereto operated by the movement of the trough, a pressing band in the trough connected to the core, means for distributing the plastic mass onto said pressing band, means for pressing said mass before it reaches the core, means for simultaneously rotating and longitudinally moving the core to wrap said band together with the mass around the core, means for pressing said pressing band to the mass during its wrapping, a reel for said pressing band, means for reversing the movements of the core for unwrapping said band from the core, a reel for a coating strap to be wrapped around the tubular body after the last layer has been wound on by the pressing band, means to connect said reel for the coating strap with the reel for the pressing band so that by unwinding the coating strap from its reel the pressing band reel is rotated to wind up the pressing band.

5. In a machine for the manufacture of reinforced hollow articles, a core, an endless trough, means for supplying a plastic mass thereto operated by the movement of the trough, a pressing band in the latter adapted to be connected to the core, means for distributing the plastic mass onto said band operated by the movement of the band, means impelled by the band for pressing said mass before it reaches the core, means for simultaneously rotating and longitudinally moving the core to wrap said band together with the mass around the core, means for pressing said pressing band to the mass during its wrapping, means for reversing the rotation of the core to unwrap the pressing band from the core, reinforcing wires for connection with the core and adapted to be wrapped around the mass during the reversed motion of the core simultaneously with the unwrapping of the pressing band from the core, spools for said wires, a reel for said pressing band, means operated by the spools for rotating the reel to wind up the pressing band during the unwrapping of said pressing band from the core, a reel for a coating strip to be wrapped around the tubular body after the last layer has been wound on by the pressing band, means to connect said reel for the coating strip with the reel for the pressing band so that the unwinding of the coating strip from its reel will rotate the pressing band reel and unwrap the pressing band from the core.

6. In a machine of the character described, the combination with a rotatable and longitudinally movable core, a flexible strip carrying a plastic mass and connected to and wound on the core by the movement of the latter, of means to remove the strip from the core and simultaneously wind a reinforcing wire onto the mass on the core.

7. In a machine of the character described, the combination with a rotatable and longitudinally movable core, a flexible strip carrying a plastic mass and connected to and wound on the core by the movement of the latter, of reinforcing wires for connection to the core and adapted to be wound onto the mass by a reverse movement of the core, and means operated by the movement of the wires by the core for unwinding the strip from the mass.

8. In a machine of the character described, the combination with a rotatable and longitudinally movable core, a flexible strip carrying a plastic mass and connected to and wound on the core by the movement of the latter, of a reel for a coating strip adapted to be rotated by a reverse movement of the core, and a reel for said flexible strip adapted to be rotated by the aforesaid reel to unwind the flexible strip from the core during said reverse movement.

9. In a machine of the character described, the combination with a rotatable and longitudinally movable core, a flexible strip carrying a plastic mass and connected to and wound on the core by the movement of the latter, of reinforcing wires for connection to the core and adapted to be wound onto the mass by a reverse movement of the core, spools for the wires, a reel for the flexible strip, and mechanism actuated by the rotation of the spools to impart a rotation to the reel to unwind the strip from the core.

10. In a machine of the character described, the combination with a rotatable and longitudinally movable core, a flexible strip connected to the latter and adapted to be wound thereon by the movements of the core, of an endless carrier supporting the strip and driven by the latter, a feeder for plastic material arranged adjacent the strip, a shaking mechanism for the feeder actuated by the movement of the carrier, a roller for pressing the material onto the strip actuated by the movement of the latter, a pivoted arm on which the roller is mounted, means for raising and lowering said arm, a gear carried by said roller, a rotary distributer mounted in front of the roller, and a pinion connected with the distributer in mesh with said gear.

11. In a machine of the character described, the combination with a rotatable and longitudinally movable core, a flexible strip connected to the latter and adapted to be wound thereon by the movements of the core, of an endless carrier supporting the strip and driven by the latter, a feeder for plastic material arranged adjacent the strip, a shaking mechanism for the feeder actuated by the movement of the carrier, a roller for pressing the material onto the strip actuated by the movement of the latter, a pivoted arm on which the roller is mounted, means for raising and lowering said arm, a gear carried by said roller, a rotary distributer mounted in front of the roller, a pinion connected with the distributer in mesh with said gear, and means for raising and lowering the distributer.

12. In a machine of the character described, a core, a flexible strip fixed to one end of the latter, means to press a plastic mass onto the strip, means to rotate the core, means to simultaneously move the latter longitudinally in one direction to wind the strip and mass around the core, means to automatically reverse said rotary and longitudinal movements, reinforcing wires adapted to be wound on the mass during the reverse movements of the core, a reel for the strip, a shaft on which said reel is mounted, a clutch to connect the reel and shaft, a cylinder fixed on the latter, and spools carrying the wires in frictional engagement with the roller to rotate the reel to wind the strip thereon during the winding of the wires.

In testimony that I claim the foregoing as my invention, I have signed my name in presence of two subscribing witnesses.

HANS SIEGWART.

Witnesses:
PAUL PELENDER,
HERMANN VÁFS.

Copies of this patent may be obtained for five cents each, by addressing the "Commissioner of Patents, Washington, D. C."